United States Patent [19]

Macnak et al.

[11] Patent Number: 4,804,954
[45] Date of Patent: Feb. 14, 1989

[54] BATTERY SAVING METHOD FOR PORTABLE COMMUNICATIONS RECEIVERS

[75] Inventors: Philip P. Macnak, West Palm Beach; David F. Williard, Plantation, both of Fla.

[73] Assignee: Motorola, Inc., Schaumburg, Ill.

[21] Appl. No.: 44,911

[22] Filed: Apr. 30, 1987

[51] Int. Cl.⁴ .......................... H04Q 7/00; H04B 7/00
[52] U.S. Cl. .............................. 340/825.440; 370/106
[58] Field of Search .................. 340/825.44; 455/228, 455/343, 222; 370/106, 93

[56] References Cited

U.S. PATENT DOCUMENTS

| 4,509,199 | 4/1985 | Ichihara | 455/343 |
| 4,577,315 | 3/1986 | Otsuka | 455/343 |
| 4,644,347 | 2/1987 | Lucas et al. | 340/825.44 |
| 4,713,808 | 12/1987 | Gaskill et al. | 370/93 |

FOREIGN PATENT DOCUMENTS

| 2110858 | 6/1983 | United Kingdom | 340/825.44 |
| 2144565 | 3/1985 | United Kingdom | 340/825.44 |
| 2177244 | 1/1987 | United Kingdom | 340/825.44 |

Primary Examiner—Donald J. Yusko
Attorney, Agent, or Firm—Joseph T. Downey; Anthony J. Sarli, Jr.; Donald B. Southard

[57] ABSTRACT

A system transmitting synchronization signals and coded message signals is described. In particular, coded synchronization signals are used to indicate the transmission of coded message signals or the absence of transmission of coded message signals following the transmission of the coded synchronization signal, thereby providing a battery saving function for a personal communications receiver.

15 Claims, 12 Drawing Sheets

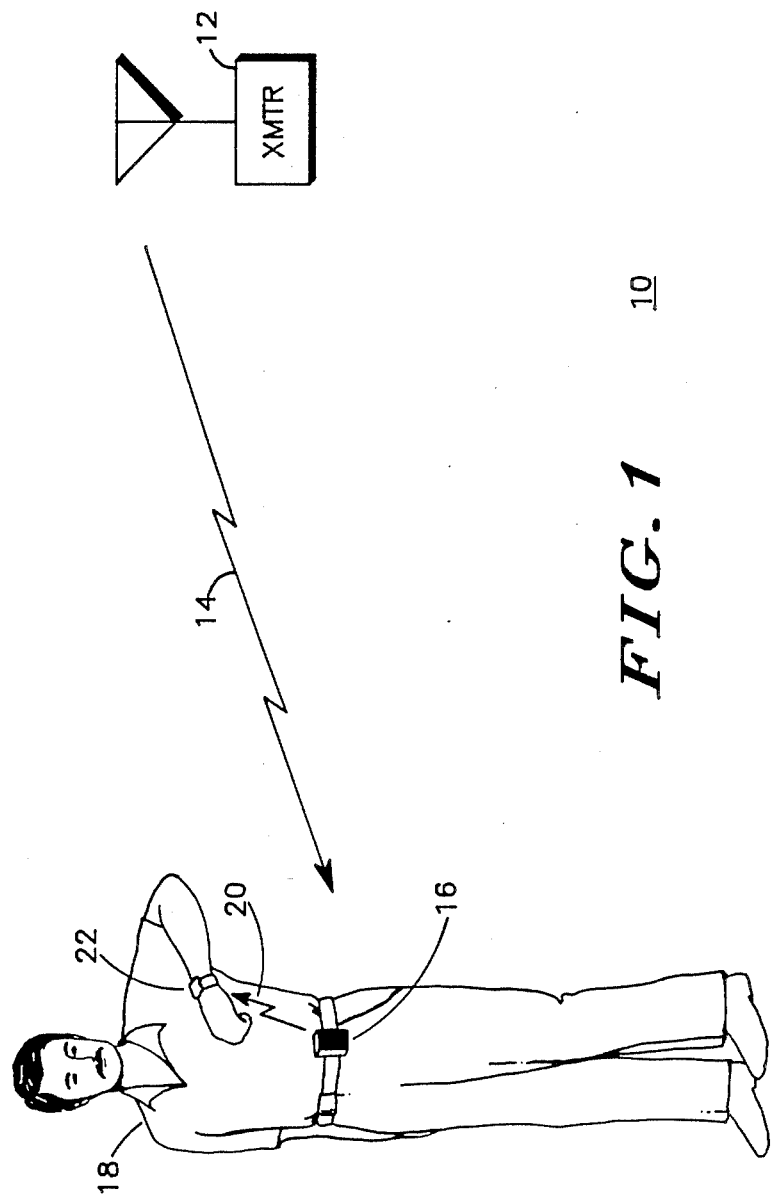

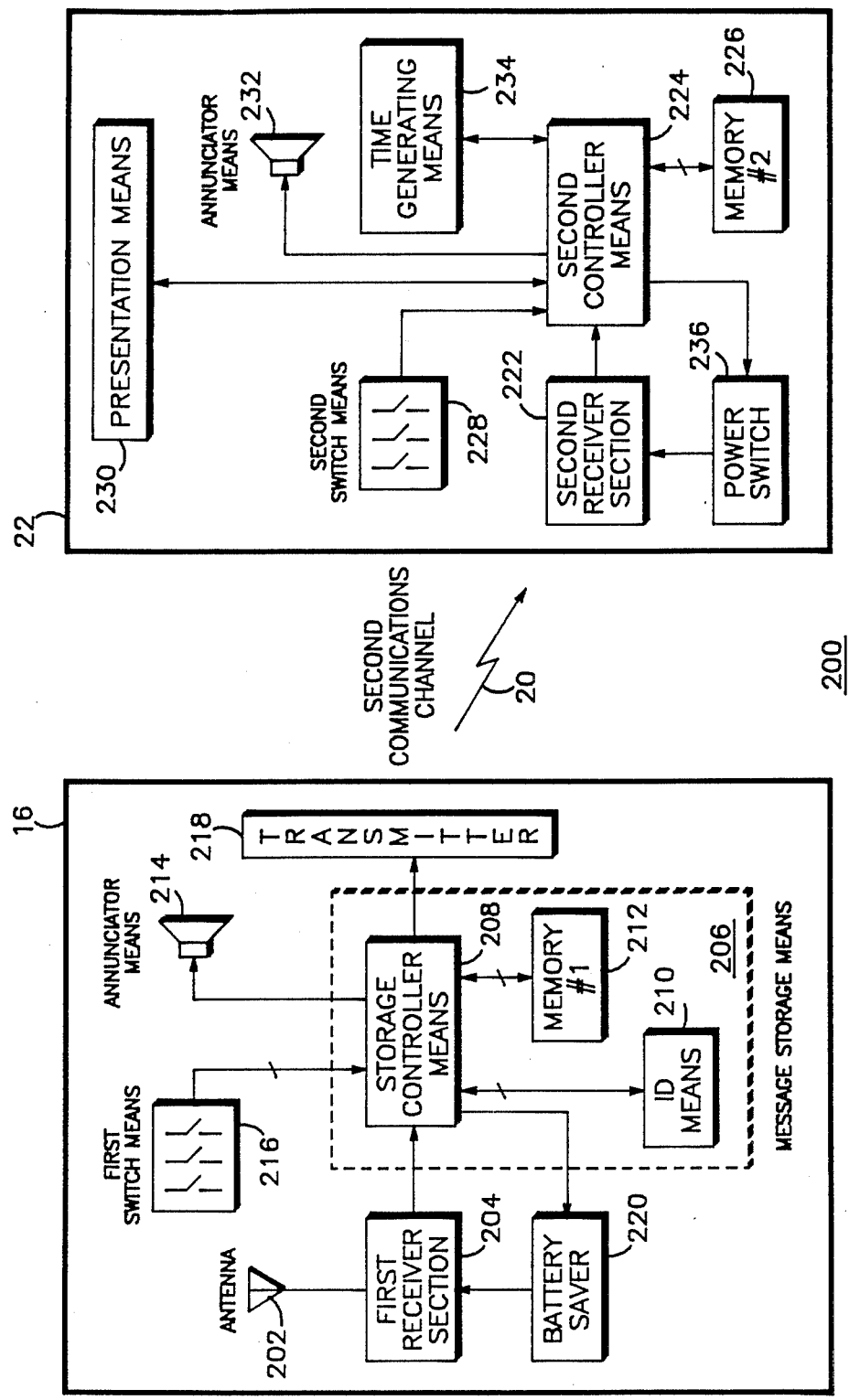

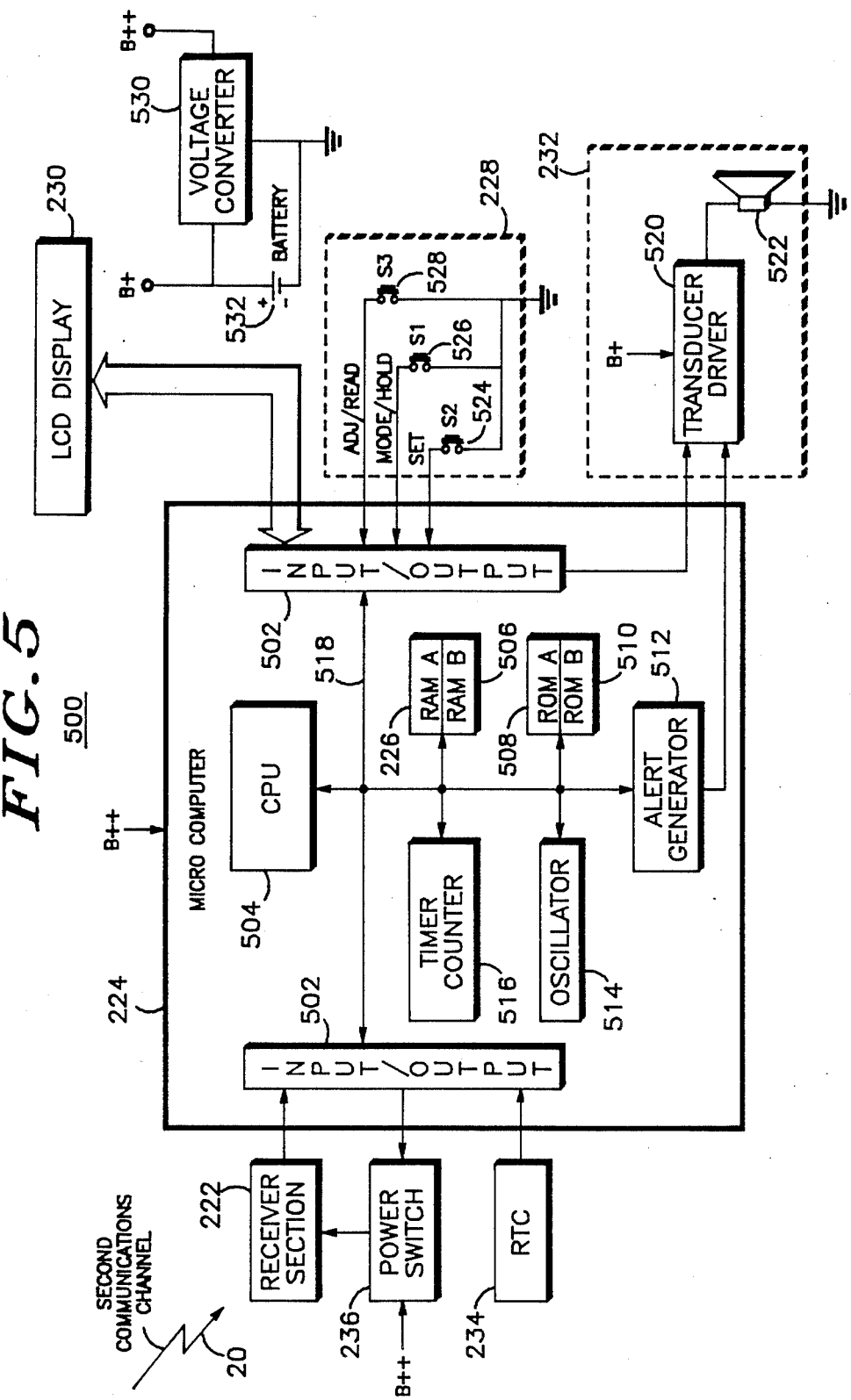

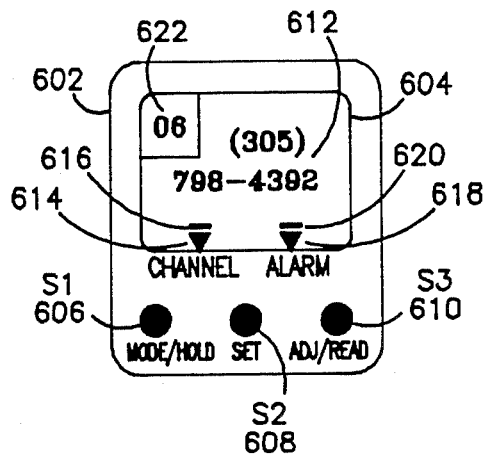

ANNUNCIATOR DEFINITION TABLE

| CHANNEL | DESCRIPTION |
|---|---|
| ▼ (SOLID) | THE CHANNEL IS OPERATING PROPERLY, THE SECONDARY UNIT IS RECEIVING SIGNALS FROM THE PRIMARY UNIT. |
| ▼ (FLASHING) | THE SECONDARY IS NOT RECEIVING SIGNALS FROM THE PRIMARY UNIT, THE USER MUST RE-ESTABLISH THE CHANNEL. |
| ▼ (FLASHING) | THE SECONDARY UNIT IS IN THE CHANNEL RE-SET MODE AND IS WAITING TO RECEIVE A SIGNAL FROM THE PRIMARY UNIT. |
| ALARM | DESCRIPTION |
| ▼ | THE ALARM ANNUNCIATORS OPERATE THE SAME AS IN PRESENT WATCHES. THE BOTTOM ANNUNCIATOR INDICATES THAT AN ALARM HAS BEEN SET AND A FLASHING TOP ANNUNCIATOR INDICATES THAT THE UNIT IS IN THE ALARM SET MODE. |

FIG. 7

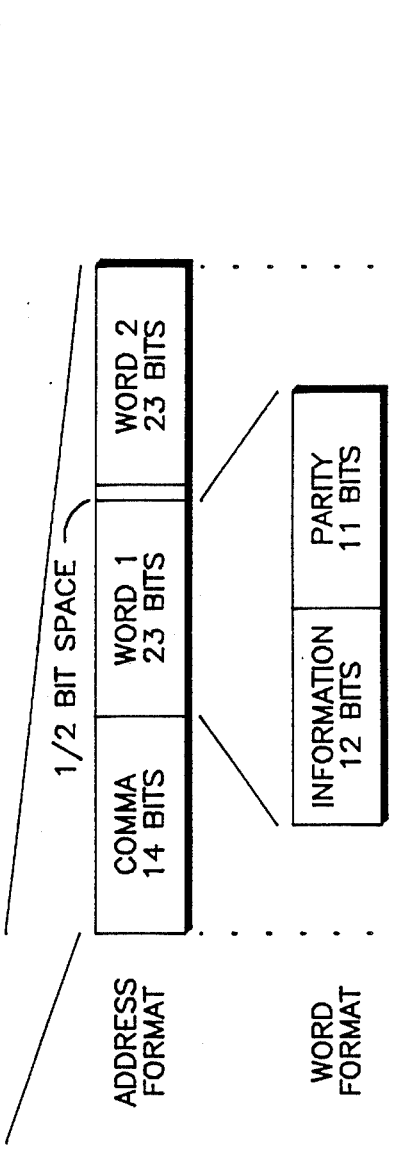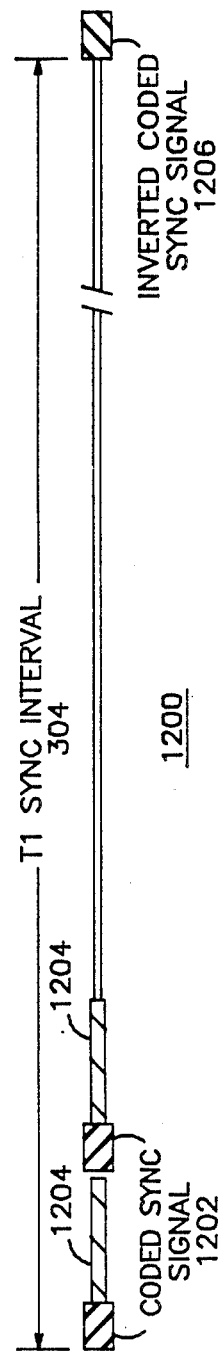
FIG. 10A
FIG. 10B
FIG. 10C
FIG. 10D
FIG. 12

MULTIPLE UNIT OPERATION

BATTERY SAVING METHOD FOR PORTABLE COMMUNICATIONS RECEIVERS

FIELD OF THE INVENTION

This invention relates to radio communications receivers in general, and more particularly to a battery saving function for portable radio communications receivers.

BACKGROUND OF THE INVENTION

Portable communications receivers, and more particularly paging receivers require a substantial battery to power the receiver and decoder electronics in order to provide acceptable battery life. Battery saving circuits are generally employed to reduce the overall power drain of the receiver electronics. Newer technologies, such as microprocessors are being used to integrate a variety of functions, such as those associated with decoding and message presentation to further minimize power consumption. Improvements are still needed to increase battery life, even with the use of new technologies noted above. One such area relates to improvements in battery saving performance which is achievable by modifying system operation based on loading.

Current battery saving methods do not provide for changes of loading on a system. This is especially true in the evening and night hours when the loading on a system is substantially less than the daytime hours. Most battery saving methods provide only predetermined operational characteristics which are constant throughout the day. Adjusting the battery saver operation in lightly loaded periods can greatly increase battery life.

Current battery saving methods are also only effective in conventional paging systems where all receivers are either synchronized to a common transmission or which require long preambles, as in the case of non-synchronous systems. These methods have limited application beyond their originally designed operation. There is a need for a battery saving method which not only improves the performance on a conventional paging system, but which may also be applied to a secondary channel where information received on the primary channel is retransmitted to a second receiver on a secondary channel. Since the transmissions to the primary receiver are completely random, any retransmission of information occurring on the secondary channel would be expected to be completely non-correlated with those of the primary channel. It is contemplated that many retransmissions of information from many different transmitters operating on a common frequency would occur on the secondary channel. In this case, a method of not only providing a battery saving function based on system loading is required, but also one which provides security in the transmission is required to prevent receivers, other than to which the transmission is intended, from receiving the transmitted information.

SUMMARY OF THE INVENTION

It is therefore an object of the present invention to provide a portable communications receiver with an improved battery saving function.

It is a further object of the present invention to provide a portable communications receiver with an improved battery saving function that can adjust for loading on the system.

It is a further object of the present invention to provide a portable communications receiver with an improved battery saving function that also can provide security in the transmission of information.

A system for transmitting synchronization signals and coded message signals is described which uses coded synchronization signals. The coded synchronization signals indicate the transmission of coded message signals and the absence of transmission of coded message signals following the transmission of the coded synchronization signal, thereby providing an improved battery saving function. Two coded synchronization signals are provided which are coded binary words. The coded synchronization signals are complements of each other.

These and other objects and advantages of the present invention will become apparent to those skilled in the art upon consideration of the following description and accompanying drawings of the present invention.

BRIEF DESCRIPTION OF THE DRAWINGS

The features of the present invention which are believed to be novel are set forth with particularity in the appended claims. The invention itself, together with its further objects and advantages thereof, may be best understood by reference to the following description when taken in conjunction with the accompanying drawings, in the several figures of which like reference numerals identify identical elements, in which and wherein:

FIG. 1 is a diagram showing an application of the preferred embodiment of the present invention.

FIG. 2 is a functional block diagram of the apparatus of the present invention.

FIG. 5 is a diagram of the second receiver means implemented using a microprocessor for the preferred embodiment of the present invention.

FIG. 6 is a pictorial view of the wrist worn presentation unit in the preferred embodiment of the present invention.

FIG. 7 is a table describing the annunciator functions of the wrist worn presentation unit in the preferred embodiment of the present invention.

FIGS. 10A-D are diagrams describing the Golay Sequential Code signalling format.

FIG. 12 is a diagram of the secure synchronous signalling format utilized in the preferred embodiment of the present invention.

DESCRIPTION OF THE PREFERRED EMBODIMENTS

Figure 3A:
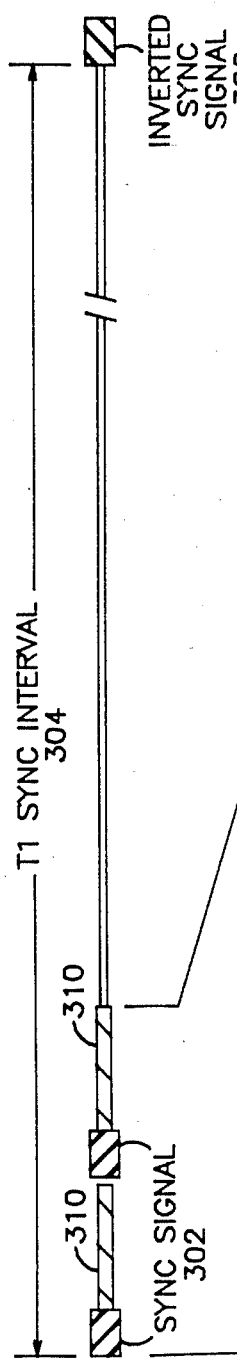
FIGS. 3A-C are diagrams of the synchronous signalling format utilized in the preferred embodiment of the present invention.

Reference is now directed to the drawings, and more particularly to FIG. 1, which shows a typical diagram of a communications system 10 incorporating the preferred embodiment of the present invention. As shown in FIG. 1, a communications transmitter 12 transmits coded message signals in the form of selective call messages, or pages, on a first communications channel 14 to a portable radio communications receiver, or pager 16. It will be appreciated that communications system 10 need not be limited to a single transmitter as shown, but may include communications systems with multiple transmitters as well.

The transmitted selective call messages include addresses identifying the pager to which the messages are directed. The addresses are generally followed by voice or data messages. One or more of these transmitted selective call messages may be directed to pager 16 as shown in FIG. 1. Pager 16, in this case, is carried on the belt of user 18. It will be appreciated that pager 16 may be carried in other locations equally as well, such as in a shirt or pants pocket, or in a purse. The transmitted selective call messages are received and detected by pager 16. The addresses are decoded in a manner well known to those skilled in the art, and those addresses directed to pager 16 result in data messages being stored and a sensible alert, which may be audible or tactile, being generated. When voice messages are transmitted, which follow the address, the sensible alert is first generated followed immediately by the voice message.

The voice or stored data message is than transmitted using a low power transmitter located in pager 16 on a second communications channel 20 to a separate wrist worn message presentation unit 22. Second communications channel 20 in the preferred embodiment is a low power FM signal, although other forms of non-wire communications, such as ultrasonic and infrared signals, or other radio frequency signals as low power AM, could be used equally as well.

The messages transmitted on second communications channel 20 are received and detected by presentation unit 22. The messages received are then presented to user 18 as a visual display for data messages or audibly for voice messages. By locating presentation unit 22 on the wrist, user 18 can readily respond to the received message by moving presentation unit 22 to a position which allows convenient viewing or listening of the received messages. It will also be appreciated that presentation unit 22 may take other forms as well, such as bracelets, pendants, necklaces or the like, which can perform the same function of allowing convenient viewing or listening of the received messages.

Reference is now directed to FIG. 2 which shows a functional block diagram of the apparatus 200 comprising the preferred embodiment of the present invention. Pager 16 of FIG. 1 corresponds to first receiver means 16 which consists of a first receiver section 204 and antenna 202, capable of receiving the selective call messages transmitted on first communications channel 14. The output of first receiver section 204 is a demodulated signal which includes the selective call addresses and associated voice or data messages. The output of first receiver section 204 couples to message storage means 206 which provides selective call decoding functions, and controls message storage and retransmission of stored messages on the second communications channel 20 to second receiver means 22, which corresponds to presentation unit 22 of FIG. 1.

Message storage means 206 consists of storage controller means 208, identification (ID) means 210 and memory #1 or first memory means 212. Identification means 210, consists of a read-only memory, such as an EEPROM (electrically erasable programmable read only memory), which stores one or more predetermined addresses identifying those messages to which first receiver means 16 will respond. Storage controller means 208 provides the decoding function, in a manner well known to those skilled in the art, by comparing the received addresses with the stored predetermined addresses. When any of the received addresses match those stored in identification means 210, storage controller means 208 stores the subsequently received data message in first memory means 212. A sensible, audible or tactile, alert is then delivered by annunciator means 214 indicating a message has been received. In the preferred embodiment of the present invention, first memory means 212 is a random access memory capable of storing multiple messages. Storage controller means 208 also formats the stored messages in a serial fashion for transmission by transmitter 218 to second receiver means 22.

First receiver means 16 also includes switch means 216, consisting of manually actuatable switches, for controlling first receiver means 16 functions, such as ON/OFF, RESET and TRANSMIT. The ON/OFF function turns first receiver means 16 power on and off. The RESET function allows manual reset of the sensible alert prior to an automatic time out period, such as eight seconds. The TRANSMIT button allows a data message which has been stored in first receiver means 16 to be retransmitted. Multiple actuations of the TRANSMIT button allows transmitting the current message, as well as previously received messages to second receiver means 22 where they may be readily viewed.

As previously stated, the secondary communications channel 20 is a low power FM signal in the preferred embodiment, linking transmitter 218 located in first receiver means 16, and second receiver section 222 located in second receiver means 22. The serial data message from I/O Port 442 couples to modulator 444, the output of which couples to transmitter 446. FSK modulation is used in the preferred embodiment, although other modulation methods can be used as well. The low power FM transmitter can be designed to operate on any of the unlicensed frequencies authorized by the FCC, Part 15, Section 15.101, eliminating the need to separately license the wrist worn presentation unit.

The output of section receiver section 222 is a serial stream of information corresponding to the serially transmitted data messages, or an analog signal corresponding to the voice messages. The output of second receiver section 222 couples to second controller means 224, which controls the storage of the received data messages in memory #2, or second memory means 226. Second memory means 226 is preferably a random access memory providing storage for at least one data message. Second controller means 224 also controls the delivery of the received voice and data messages by presentation means 230 or annunciator means 232.

Time generating means 234 couples to second controller means 224 and provides watch functions, such as time, and day and date which are displayed on presentation means 230 when data messages are not being presented. Annunciator means 232 couples to second controller means 224 and provides a sensible alert, either audible or tactile, for indicating a message has been received and stored. Audible alarm functions for time keeping means 234 are also provided by annunciator means 232.

Second switch means 228, consisting of manually actuatable switches, couples to second controller means 224 and provides control of time generating means 234, such as setting the time or alarm. Second switch means 228, also provides control of message presentation, such as recall of the data message stored in second memory means 226, and reset means for resetting the audible alerts provided by annunciator means 232.

In order to conserve battery drain, first receiver means 16 also can include a battery saver circuit 220. The operation of battery saver circuit 220 is used in a conventional paging receiver is well known to those skilled in the art.

It will be appreciated by those skilled in the art that from the description of the preferred embodiment of the present invention already provided, first receiver means 16 may be constructed in a manner somewhat similar to a conventional paging receiver. Consequently, excellent receiver sensitivity, immunity to falsing, and reliable voice and data message reception are obtainable as in a conventional paging receiver. The battery used to power first receiver means 16 may also be selected to provide battery life at least as good as conventional paging receivers, given the high current requirements of a quality communications receiver. By storing all received data messages in first memory means 212, the user is insured all messages directed to him/her are available for review. Even when the transmission to second receiver means 22 is corrupted, such as by blocking either transmitter 218 transmission or separate wrist worn receiver 22 reception, data messages are recoverably by simply recalling the last message received as previously described. An indication is provided by the separate wrist worn receiver when loss of message occurs which will be described in detail shortly.

It should also be noted, that a certain amount of redundancy is built into the preferred embodiment of the present invention. This is particularly true with respect to first annunciator means 214 and second annunciator means 232. By means of first switch means 216 and second switch means 228, the user can select the alert to be delivered from only one annunciator or both. Since the volume producible by first annunciator means 214 is greater than that deliverably by second annunciator means 232, first annunciator means 214 may be selected when ambient noise levels are high, and second annunciator means 232 may be selected when ambient noise levels are low, as an example.

Figure 3B:
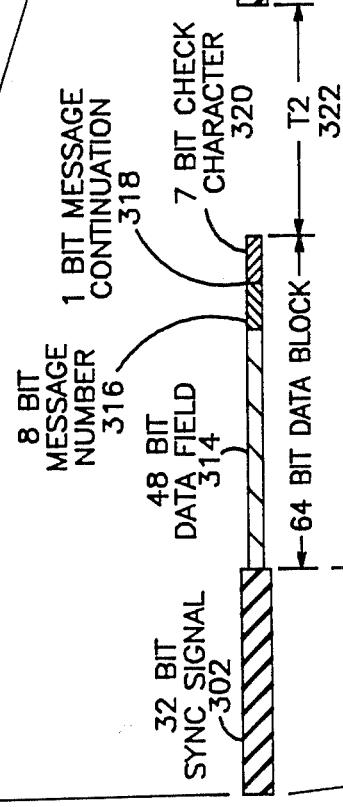
Figure 3C:
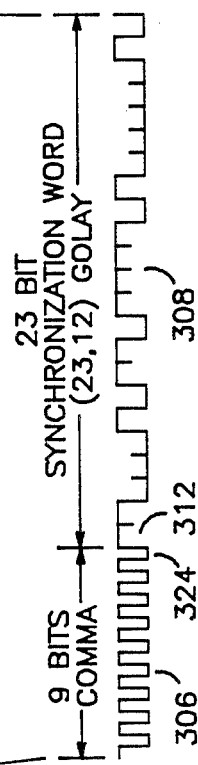

In the preferred embodiment, second receiver means 22 is constructed to minimize current drain requirements. This is accomplished through the use of low current drain components for the circuit elements, as will be explained in detail later in the specification. Current drain is further minimized by using a synchronous data message transmission on the second communications channel 20. Reference is now directed to FIGS. 3A-3C which shows a diagram of the synchronous signalling format 300 employed in the present invention. The signalling format shown is an adaptation of the Golay Sequential Code format widely used by the assignee of the present invention for non-synchronous data transmission, which has been adapted for use in a synchronous system. It will be appreciated, other selective call signalling formats, such as the POCSAG signalling format which is a synchronous signalling format, could also be adapted without departing from the scope or spirit of the present invention.

As shown in FIG. 3A, synchronization signal 302 is transmitted at least once during a periodically generated time interval 304, which in the preferred embodiment of the present invention is sixty seconds. It will be appreciated by one skilled in the art that this time interval can be longer or shorter without departing from the scope or spirit of the present invention.

Data messages are transmitted on first communications channel 14 using conventional synchronous or asynchronous signalling formats which are well known to one skilled in the art. It will be appreciated that data messages can be received during time interval 304 when second receiver means 22 is not responsive to receiving the data messages. So as to avoid confusion, the alerting signal normally generated by first receiver means 16 upon receipt of the data message over first communications channel 14 is delayed until after the data message has been transmitted to second receiver means 22. Time interval 304 is selected to maximize battery life while maintaining an acceptable time delay from receipt of a data message by first receiver means 16 to presentation of the data message by second receiver means 22. At sixty seconds for time interval 304, the average delay from receipt of a data message to presentation of the data message is thirty seconds. The data messages are transmitted following synchronization signal 302, and one or more data blocks 310 may be transmitted, as shown in FIG. 3A, When multiple data blocks are transmitted, a synchronization signal precedes the transmission of each data block, as shown. Data messages are also transmitted after actuation of the TRANSMIT switch by the user, retransmitting the previously stored message. Since data message transmission occurs only a relatively small number of times each day, most transmissions include only the synchronization signal. When the synchronization signal is transmitted without a data message, inverted (i.e. complemented) synchronization signal 326 is transmitted in place of synchronization signal 302. When inverted synchronization signal 326 is detected, power to second receiver section 222 is suspended immediately after the synchronization signal, increasing the battery saver performance.

As shown in FIG. 3C, synchronization signal 302 consists of nine bits of comma 306 and a twenty-three bit synchronization word 308, which is common to all second receiver means 22. The transmission rate for synchronization word 308 and data block 310 is 600 bits per second, although other data rates could be used equally as well. When the synchronization signal is inverted, as previously described, this is accomplished by inverting the synchronization word. Comma 306 is an alternating one-zero pattern transmitted at twice the bit rate of synchronization word 308 for a time period equivalent to nine data bits. Synchronization word 308 is a single 23,12 Golay coded word. The last bit 324 of comma 306 is always of opposite phase to the first bit 312 of synchronization word 308, as shown in FIG. 3C.

Comma 306 is generated before synchronization word 308 for two purposes. Comma 306 insures that when second receiver means 22 begins receiving the synchronization signal, uncorrelated data is initially received, thereby insuring proper decoding of synchronization word 308. In the preferred embodiment of the present invention the decoding of synchronization word 308 is accomplished using a "block" decoder. Such a decoder is described in U.S. Pat. No. 3,801,9228 to Braun et al, entitled "Digital Sequence Detector Using Multiple Samples During Each Digit Time Period" which is assigned to the assignee of the present invention and which is incorporated for reference herein. The "block" decoder provides synchronization of second receiver means 22 with first receiver means 12 without the requirement for bit synchronization employed in most synchronization systems. The "block" decoder also provides the ability to synchronize on either the non-inverted or inverted synchronization word. In addition, the nine bits of comma 306 allow for timing differences between first receiver means 16 and second receiver means 22 clocks. In the preferred embodiment of the present invention, this timing difference is approximately plus or minus four and one-half bits for a system clock stability of 120 ppm over time interval 304.

Following synchronization signal 302 is a sixty four bit data block 310, shown in FIG. 3B, consisting of a forty-eight bit data field 314, an eight bit message number 318, a single message continuation bit 318, and a seven bit check block 320. Depending upon the type of data message transmitted, it will be appreciated that data field 314, as described consisting of forty-eight bits, may contain different data formats, such as twelve four bit BCD blocks for numeric only characters, or six eight bit ASCII blocks for alphanumeric characters. Because of the short distance for transmission between first receiver means 16 and second receiver means 22, and the ability to retransmit a message if it is corrupted in transmission, the data message is transmitted without any special error correction. As will be described in detail shortly, a check block 320 is provided which can indicate when a message is corrupted, and should be retransmitted.

Since first memory means 212 is capable of storing multiple data messages, message number 318, shown in FIG. 3B, is used to identify the number of the currently displayed data message. This information is useful for a variety of reasons, such as an indicator of a missed or unread message when the number changes by two or more since the last received data message. Message number 318 also indicates when first memory means 212 "rolls over", and new messages begin overwriting the earliest previous messages. Message number 318 also ensures to the user that messages which are longer than a single display due to a continuation are combined to a single data message.

Message continuation bit 318, shown in FIG. 3B, is included to identify data messages transmitted which are longer than twelve numeric characters, or six alphanumeric characters, as previously described. In the preferred embodiment of the present invention, message continuation bit 318 is a "0" when data message continuation is not required, and a "1" when a message continuation will occur. It will be appreciated, multiple continuations of a data message can be allowed, limited only by the amount of memory provided to store the incoming data messages. When data messages are longer than one data block in length, a second time interval 322 is provided between data blocks. This time interval allows time to verify the previous data block was transmitted correctly and stored before the next data block is received. It will be appreciated, the length of time interval 322 is a matter of design choice, and depending upon operation may not be required.

Check character 320, shown in FIG. 3B, provides an overall check of data block 310. Check character 320 provides a convenient means of indicating data messages transmitted between first receiver means 16 and second receiver means 22 have not been corrupted in transmission. As messages are received, second receiver means computes the value of check character 320. If this value does not match the transmitted value of check character 320 the data message transmitted has been corrupted, and an error message is presented on the display of second receiver means 22, indicating to the user that he should actuate the TRANSMIT switch on first receiver means 16 retransmitting the received data message.

It will be appreciated by one skilled in the art that the size of data block 310, the size of data field 314, the size and format of message number 316, and the size and format of check block 320 are a matter of design choice. Consequently, changes in the size of any of the blocks to allow more or less characters to be transmitted, and changes to the format of the transmission of the information, may be made without departing from the scope or spirit of the preferred embodiment of the present invention.

Figure 4:
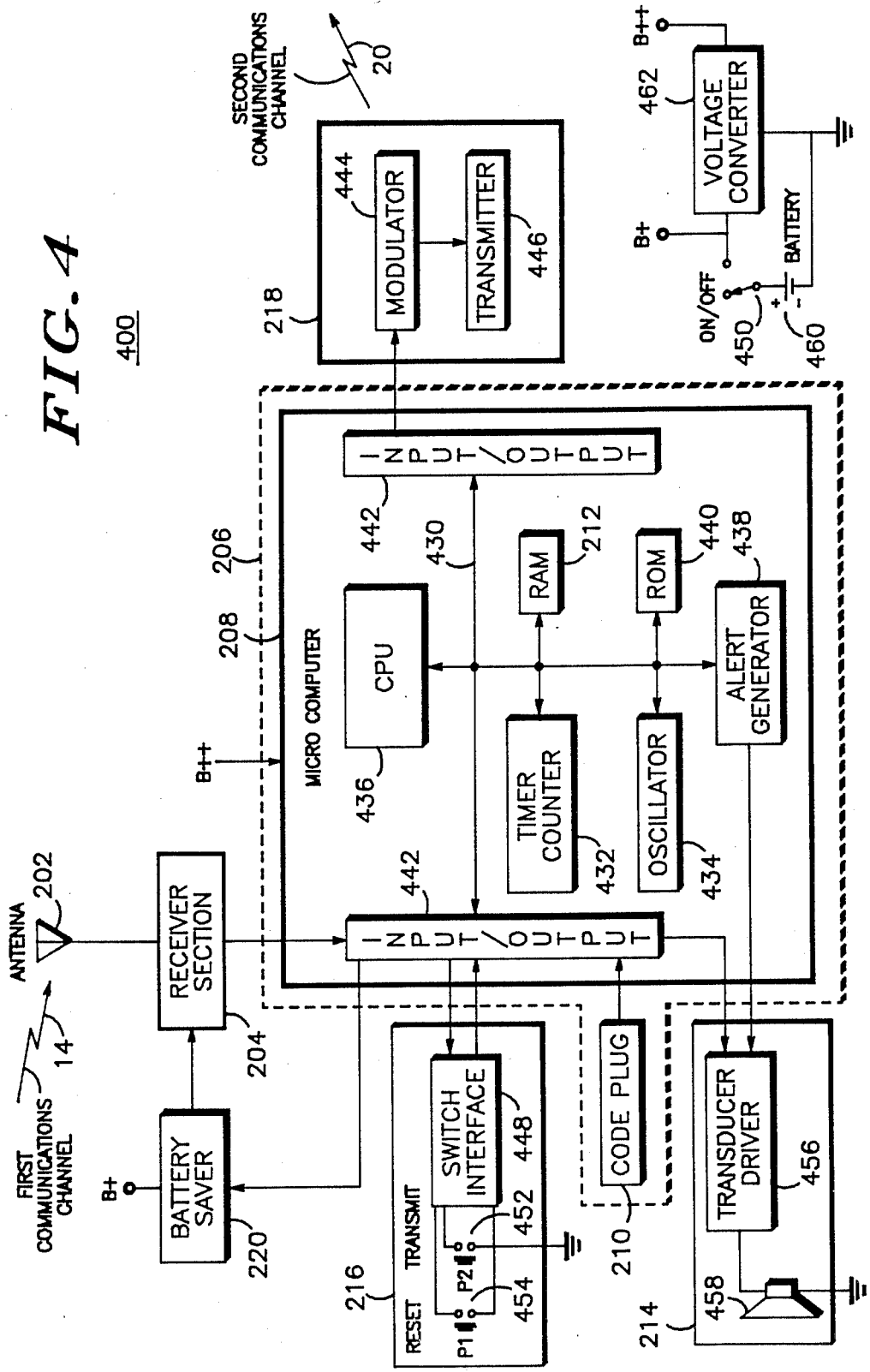
FIG. 4 is a diagram of the first receiver means implemented using a microprocessor for the preferred embodiment of the present invention.

Reference is now directed to FIG. 4 which shows the preferred embodiment of the apparatus 400 utilizing a microcomputer implementation for first receiver means 16. Antenna 202 and receiver 204, corresponding to first receiver section 204 of FIG. 2, receives and detects data messages transmitted on first communications channel 14. The output of receiver 204 connects to message storage means 206 which consists of storage controller means or microcomputer 208, identification means or code plug 210 for storing addresses and first memory means or RAM 212 for storing data messages.

Microcomputer 208 is a single chip microcomputer, such as the MC68HC05L6 manufactured by Motorola. Microcomputer 208 includes a CPU 436 for operational control. An internal buss 430 connects all the elements of microcomputer 208. I/O port 442 (shown split in the figure) provides communications to the circuits external to microcomputer 208. A Timer Counter 432 is used to generate timing intervals, such as required for battery saver operation on the first communications channel, or synchronization signal generation. Oscillator 434 provides the reference frequency for operation of CPU 436. RAM 212 is used as temporary storage of program variables, and also provides storage for the received data messages. It will be appreciated by those skilled in the art, that additional RAM, external to the microcomputer may be added to provide additional message storage space. ROM 440 contains the firmware controlling microprocessor 436 operation. Programs, such as for decoding, battery saver operation, synchronization signal generation and message transmission, are stored in ROM 44. An alert generator 438 provides the alerting signal in response to decoding the address information.

Power for the apparatus 400 is provided by a single cell battery 460. An ON/OFF switch 450, corresponding to part of first switch means 216 of FIG. 2, allows the user to turn power on and off to the unit. A voltage converter 462 steps up the output voltage from battery 460 to a voltage level sufficient to power microcomputer 208, such as 3.0 volts. Any other circuit elements which may require the higher operating voltage are also supplied from the output of voltage converter 462. It will be appreciated that while the preferred embodiment only operates from a single battery, multiple batteries could be provided, which would also eliminate the need for voltage converter 462.

As shown in FIG. 4, first switch means 216 further comprises a manually actuatable RESET switch 454 and a TRANSMIT switch 452. A switch interface 448 provides the electronics necessary to couple the switches to I/O buss 442. RESET switch 454 allows manual reset of the sensible alert generated after a message has been received and prior to an automatic time out period, such as eight seconds. If the pager is capable of receiving voice messages, RESET switch 454 can also be used to monitor the first communications channel.

TRANSMIT switch 452 allows a data message which has been stored in RAM 212 memory to be retransmitted over the second communications channel. A single actuation of TRANSMIT switch 254 allows transmitting the current message, and repeated actuations thereafter allow transmitting previously received messages as well.

As will be described in detail shortly, there will be times when synchronization between the two units must be restored. When this is required, the user by actuating and holding RESET switch 454 and then momentarily actuating TRANSMIT switch 452 places the pager into the sync or channel acquisition mode, required to initialize synchronization between the two units.

Annunciator means 214 is shown to comprise transducer driver 456 and transducer 458. In response to a data message being received, alert generator 438 generates an audible alert frequency, such as 3 KHz. The output of alert generator 438 couples to transducer driver 456 as well as an output from I/O port 442. I/O port 442 controls the delivery of the alerting signal providing such functions as silent alert operation, i.e. inhibiting the delivery of the alerting signal, and an interrupted alert signal output. The alerting signal is delivered to the user by transducer 458.

Data messages that have been received and stored are transmitted over second communications channel 14 by first transmitter means 218 which is comprised of a modulator 444 and transmitter 446. Depending upon the format of second communications channel 14, transmitter 446 may deliver the signal to an antenna, as in the case of a radio frequency transmission; a transducer, as in the case of an ultrasonic transmission; or a light emitting diode, as in the cases of an infrared transmission.

Microcomputer 208 controls battery saving operation in a manner well known to one skilled in the art by periodically generating a control signal delivered from I/O 442 to battery saver circuit 220. Battery saver circuit 20, in turn, controls the supply of power to receiver section 204, thereby minimizing the power consumption.

Reference is now directed to FIG. 5 which shows the apparatus 500 corresponding to second receiver means 22 which is implemented using a microprocessor. The messages transmitted over second communications channel 20 are received by receiver 222, corresponding to second receiver means 222 of FIG. 2. The output of receiver 222 of FIG. 5 is a serial stream of information corresponding to the serially transmitted data message. The output of receiver 222 couples to I/O port 502 of microcomputer 224, which corresponds to second controller means 224 of FIG. 2. Microcomputer 224 is a single chip microcomputer, such as the MC68HC05L6 manufactured by Motorola. Microcomputer 224 includes a CPU 504 for operational control. An internal buss 518 connects all the elements of microcomputer 224. I/O port 502 (shown split in the figure) provides communications to the circuits external to microcomputer 224. A Timer Counter 516 is used to generate timing intervals, such as required for synchronization with first receiver means 16.

Oscillator 514 provides the reference frequency for operation of CPU 504. The oscillator frequency is established by an externally connected crystal (not shown). Depending upon the frequency of operation desired, the oscillator frequency may be derived from an output of a real time clock (RTC) 234, thus requiring only a single crystal for both RTC 234 and CPU 504.

RAM A 226 is used as temporary storage of program variables, and also provides storage for the received data messages. It will be appreciated by those skilled in the art, that additional RAM, external to microcomputer 224 may be added to provide additional message storage space. ROM A 508 contains the firmware controlling microprocessor 224 operation. Programs, such as for synchronization, message reception, check character calculation and message presentation are stored in ROM A 508. An alert generator 512 provides the alerting signal in response to receiving a complete data message over second communications channel 14.

Power for apparatus 500 is provided by a single cell battery 532. A voltage converter 530 steps up the output voltage from battery 532 to a voltage level sufficient to power microcomputer 224 such as 3.0 volts. Any other circuit elements which may require the higher operating voltage are also supplied from the output of voltage converter 530. It will be appreciated that while the preferred embodiment only operates from a single battery, multiple batteries could be provided, which would also eliminate the need for voltage converter 530.

Synchronization circuit 236 couples to receiver section 222 controlling the power delivered to receiver section 222. Microcomputer 224, through I/O 502 controls when synchronization circuit 236 delivers power to receiver section 222. Power is delivered, as previously described, during the time the synchronization signal is present, and further when data messages are being transmitted.

As shown in FIG. 5, second switch means 228 comprises a manually actuatable SET switch 524 and a MODE/HOLD switch 526, and an ADJ/READ switch 528. Switches 524, 526 and 528 couple to I/O port 502.

Annunciator means 232 is shown to comprise transducer driver 520 and transducer 522. In response to a data message being received, alert generator 512 generates an audible alert frequency, such as 3 KHz. The output of alert generator 512 couples to transducer driver 520 as well as an output from I/O port 502. I/O port 502 controls the delivery of the alerting signal providing such functions as silent alert operation, i.e. inhibiting the delivery of the alerting signal, and an interrupted alert signal output. The alerting signal is delivered to the user by transducer 522.

Data messages that have been received over second communications channel 14 and stored in RAM A 226, as previously described, can be retrieved for review by actuating ADJ/READ switch 528. The messages are displayed on LCD display 230 which corresponds to presentation means 230 of FIG. 2. When a message is displayed, timer counter 516 is set to a time interval, such as eight seconds, during which the displayed message may be viewed. Upon completion of the eight second interval, the time would again be displayed. If the user requires a longer time interval to view the message, MODE/HOLD switch 526 can be actuated indefinitely freezing the display until MODE/HOLD switch 526 is again actuated.

As previously described, RAM A 226 stores the received messages. In the preferred embodiment of the present invention, only the most current message is stored and viewable in the manner just described. It will be appreciated by those skilled in the art, that multiple messages can be stored as well, and recalled for display individually using multiple actuations of ADJ/Read switch 528.

Also connected to I/O port 502 is real-time clock (RTC) 234, such as the MC146818, manufactured by Motorola, provides all the timing functions for the presentation unit. RTC 234 corresponds to time generating means 234 of FIG. 2. When messages are not being displayed, CPU 504 controls the display of time information, such as day and date, on LCD display 230. SET switch 524 allows the time information to be set, or changed. MODE/HOLD switch 526 selects which time information is to be changed, such as hours, minutes, day or date information. ADJ/READ switch 528 allows the information selected by MODE/HOLD switch 526 to be incremented until the desired information is displayed.

Reference is now directed to FIG. 6 which shows a pictorial view of the wrist worn presentation unit 600 corresponding to the presentation unit 22 of FIG. 1. As shown, presentation unit 600 consists of a housing 602 which may be attached to the wrist by a wristband or strap (not shown). Housing 602 is constructed using methods and materials well known to one skilled in the art, such as injection molded plastic, although other materials may be used equally as well. Access to the electronics is through a metal cover (not shown), such as plated sheet-metal or stainless steel attached by screws (not shown) or other suitable fasteners to housing 602.

A display area 604 is provided for viewing either a time or message display. FIG. 6 particularly shows a message display 612 consisting of two lines, one of which displays an area code, and one of which displays the phone number. It will be appreciated by those skilled in the art that all the displayed information may be placed on a single line, or that multiple lines of information may be provided allowing for the display of longer messages which may also include alphanumeric information. Message number indicator 622 provides a visual indication of the message currently being displayed. This number corresponds to the message number stored in the pager memory. Depending upon the size of the memory in the presentation unit as compared to the pager, this number could correspond to the message number as stored in the presentation unit as well.

Switches 606, 608 and 610 provide control of the time and message display functions. Annunciators 614, 616, 618 and 620 are provided which indicate the status of the various functions provided by presentation unit 600, in addition to the time or message display 612. A detailed description of the time and message display functions and annunciators will be provided shortly.

The display used in presentation unit 600 is preferably an LCD display which provides low current operation and allows convenient time, message and annunciator displays. As with similar wrist worn devices, a light function may be provided for viewing the display in the dark.

Reference is now directed to FIG. 7 which described the annunciator functions. As previously described, each annunciator actually consists of several graphic indicators, i.e. a bar and a triangle. It will be appreciated other forms of the indicators, such as other graphics or text, may be used without departing from the scope or spirit of the present invention.

When the presentation unit is synchronized with the pager, triangular CHANNEL indicator 614 is visible, as shown in FIG. 7. It will be appreciated that the pager may be turned off during normal operation, as might happen when the user turns the pager off each evening; or the battery in the pager could discharge to the point where the transmitter no longer transmits the synchronization signal; or the output of the transmitter may be corrupted by an extraneous signal, preventing the presentation unit from detecting the synchronization signal. When any of these events happen, the presentation unit continues to look for the synchronization signal to which it was previously synchronized for a period of time. If after a number of attempts to detect the synchronization signal, such as two attempts, the controller stops searching for sync, and triangular CHANNEL indicator 614 will begin to flash as indicated in FIG. 7. The user is also audibly alerted of the loss of synchronization by a short chirp being generated and delivered by annunciator 232. It will be appreciated by one skilled in the art that the audible chirp could be periodically generated for a period of time so as to insure the user is aware of the loss of synchronization. The time interval could correspond to the normal synchronization interval of sixty seconds, and may be repeated a number of times, such as three times.

When synchronization is lost, the user must place the presentation unit in the channel acquisition mode, as will be described shortly, to regain synchronization. The channel acquisition mode is indicated by bar CHANNEL indicator 616 being visible and flashing in addition to triangular CHANNEL indicator 614, as shown in FIG. 7. Within a short period of time, less than ten seconds, only the triangular CHANNEL indicator 614 will remain visible, indicating synchronization has been successfully completed.

If the user purposefully turned off his pager, flashing triangular CHANNEL indicator 614 would act as a reminder to initiate synchronization with the pager, the next time the pager is turned back on. Until then, the presentation unit acts as a conventional watch, including an alarm feature.

An automatic method of synchronizing the presentation unit to the belt worn unit could be used in place of the manually originated synchronization sequence, and methods for automatically synchronizing a receiver with a transmitter are well known to those skilled in the art.

However, the manual synchronization method described is provided in lieu of an automatic synchronization method as there will be times the user will wish to use his presentation unit without the belt worn unit. Also, because of the time duration between synchronization signals, an automatic synchronization method would substantially impact battery life, unless a means for cancelling the synchronization routine is provided, as would be required when the belt worn unit is turned off.

As indicated in FIG. 7, the alarm annunciator operates in a manner well known to those skilled in the art. When the alarm function is not selected, neither ALARM indicator 618 or 620 is visible. When the bar ALARM indicator 620 is visible, the alarm is set.

Figure 8:
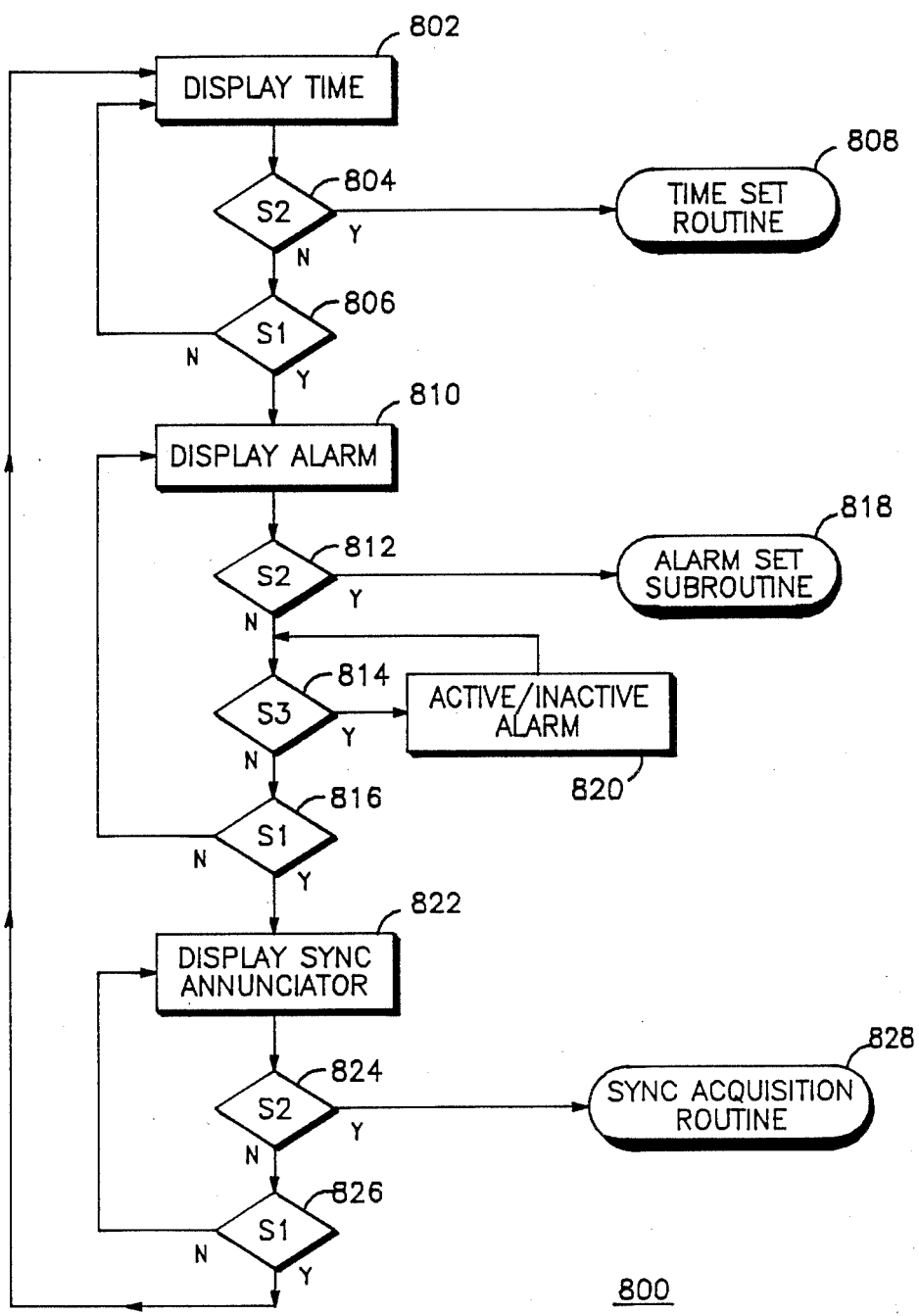
FIG. 8 is a flow chart describing the switch functions of the wrist worn presentation unit.

Reference is now directed to FIG. 8, which shows flow chart 800 indicating the functions controlled by switches 606, 608 and 610. Normally the presentation unit displays time, as shown at block 802. As long as switch S2, corresponding to Set switch 608 is not actuated, as shown at block 804, and switch S1, corresponding to Mode/Hold switch 606 is not actuated, as shown at block 806, time information remains on the display. Actuating switch S2 608, as shown at block 804, places the presentation unit in the time setting routine, as shown at block 808, which provides conventional multiple switch time setting functions. The use of multiple switches to adjust the time of a watch are well known to one skilled in the art. Actuating switch S1 606, as shown at block 806, while the time is being displayed or after the time has been set will cause the alarm time to be displayed, as shown at block 810. Actuating switch S2 608, as shown at block 812, advances the presentation unit to the alarm setting routine, as shown at block 818, which provides conventional multiple switch alarm time setting functions. The use of multiple switches to adjust the alarm time for a watch are well known to one skilled in the art. When alarm set routine, as shown at block 818, is entered, the triangular ALARM indicator 618 becomes visible.

Actuating switch S3 610, as shown at block 814, activates the alarm function, as shown at block 820, and causes the bar ALARM indicator 620 to become visible. Actuating switch S3 610, as shown at block 814, a second time, causes the alarm to be deactivated, as shown at block 820. Actuating switch S1, as shown at block 816, while the alarm time is being displayed or after the alarm time has been set, or activated, will cause the bar CHANNEL indicator 616 to become visible, as shown at block 822. Actuating switch S2 608, as shown at block 824, advances the presentation unit to the sync acquisition routine, as shown at block 828. The sync acquisition routine will be described in detail with FIG. 9. Actuating switch S1, as shown at block 826, returns the presentation unit to the normal time display mode, as shown at block 802.

Figure 9:
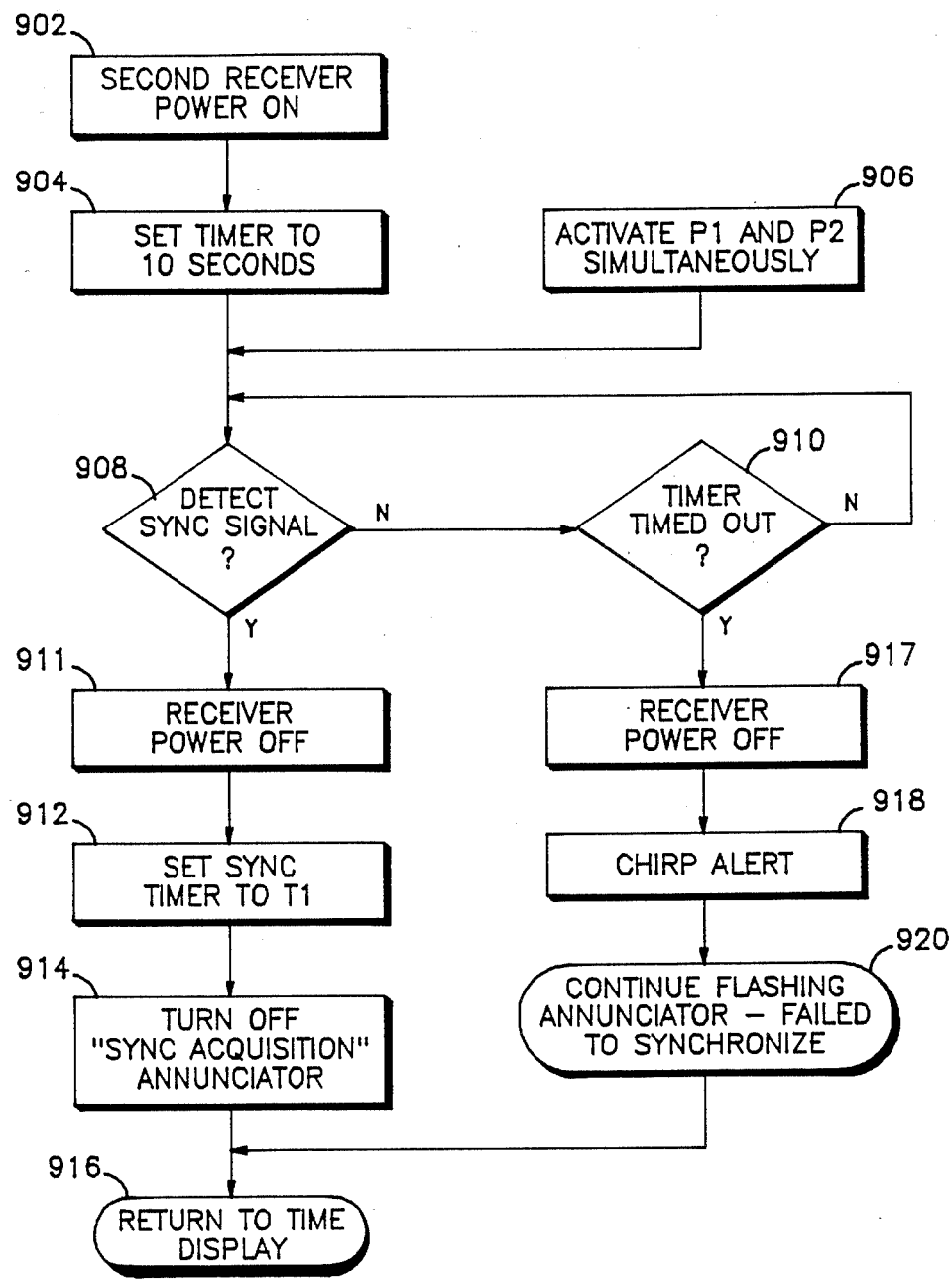
FIG. 9 is a flow chart describing the channel acquisition mode used in the preferred embodiment of the present invention.

Reference is now directed to FIG. 9, which shows flow chart 900 indicating the sync acquisition mode. When the user has entered the sync acquisition mode as previously described in FIG. 8, synchronization means 236 supplies power to receiver 222 (as shown in FIG. 5) continuously, as shown at block 902. Timer/counter 516 is set to a time interval, such as ten seconds, as shown at block 904, which is long enough for the user to actuate and hole RESET (P1) switch 454 and actuate TRANSMIT (P2) switch 452, as shown at block 906. A synchronization signal is then transmitted over the second communications channel, which when detected, as shown at block 908, suspends power to the receiver, as shown at block 911, and resets timer/counter 432 to the sync interval time T1 of sixty seconds, establishing the sync timer, as shown at block 912. The bar CHANNEL indicator 616 is turned off and the triangular CHANNEL indicator stops flashing, as shown at block 914, and the unit returns to the time display, as shown at block 916, completing the resynchronization of the two units.

If the synchronization signal is not detected, as shown at block 908, within the ten seconds time interval, as shown at block 910, power to the receiver is suspended, as shown at block 917, and an audible chirp is generated, as shown at block 918, indicating the two units failed to synchronize. Triangular CHANNEL indicator 614 will continue to flash as shown at block 920, and the unit will return to the time display, as shown at block 916. The user must reenter the sync acquisition mode, as previously described, to again attempt to resynchronize the two units.

Reference is now directed to FIG. 10 which shows the signalling format of the Golay Sequential (GSC) Code. The GSC code format is one of a number of formats in use today to provide the basic communications between the system transmitter operating on the first communications channel and the belt worn pager. Other coding formats, such as the POCSAG signalling format, can be also be use without departing from the scope or spirit of the present invention.

FIG. 10A shows that data messages are transmitted beginning with an address which identifies the pager to which the message is being sent, followed by one or more data blocks containing the message information.

As shown in FIG. 10B, addresses used in the GSC signalling format consist of a fourteen bit comma, which is an alternating one/zero pattern transmitted at twice the bit rate of the address information. Following the comma are two Golay words, a word 1 and a word 2, separated by a half bit space. Each Golay word consists of twelve information bits followed by eleven parity bits, as shown in FIG. 10C for a total of twenty-three bits. The Golay word 1's are selected from a group of fifty binary words and their complements, for a total of one hundred unique word 1's. Likewise, the Golay word 2's are selected from a different group of 2048 binary words and their complements, for a total of 4096 unique words 2's.

As shown in FIG. 10D, the format of the data block following the Golay address consists of a half bit space followed by eight data words encoded in a 15,7 BCH format. The length of the data block is the same as a Golay address, allowing simple interleaving of address and data information.

Figure 11A:
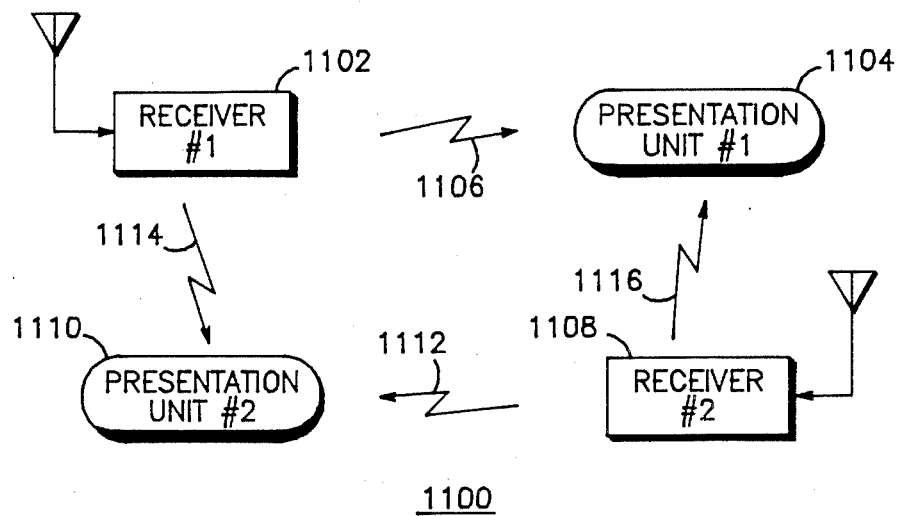
FIGS. 11A-C are diagrams describing the interleaving of multiple transmissions on a single channel in the preferred embodiment of the present invention.
Figure 11B:
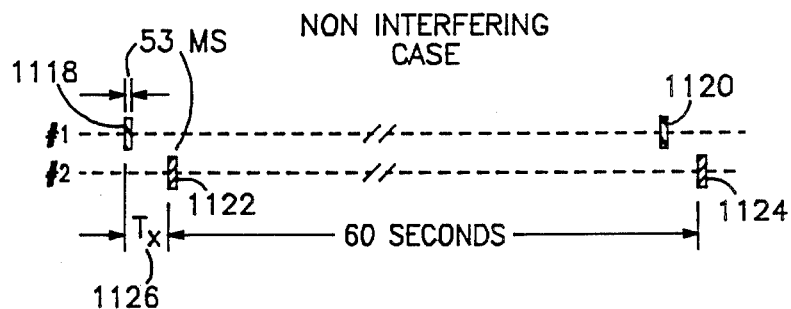
Figure 11C:
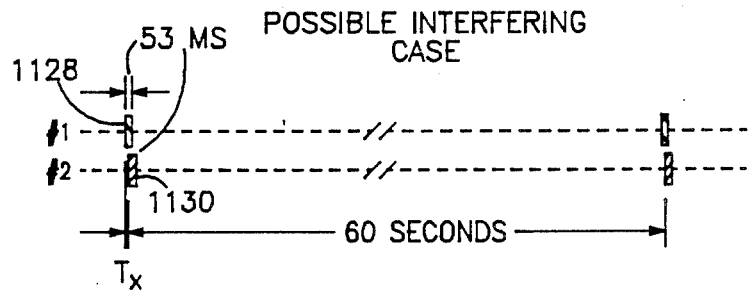

Up to now the communications on the second communications channel between the belt worn pager and separate presentation unit has been described in detail, considering only the situation involving a single user and further considering the transmissions to, in effect, be identical to, but delayed from, the first communications channel. Several problems can occur when multiple users are in close proximity to each other, as shown in FIG. 11. The two users are represented by receiver 1102 which normally communicates to presentation unit 1104 over second communications channel 1106, and receiver 1108 which normally communicates to presentation unit 1110 over second communications channel 1112, as shown in FIG. 11A. Both receivers operate on the same first communications channel, however, because they have different addresses assigned to each of them, only those messages directed to them are received. Both users also share a common second communications channel or frequency, and as shown, when receiver 1102 transmits the message received over the second communications channel 1106 to presentation unit 1104, presentation unit 1110 can also receive the same message over second communications channel 1114. In general, however, presentation unit 1110 will not receive the message because it is synchronized with receiver 1108, not with receiver 1102. As shown in FIG. 11B receiver 1102 generates a synchronization pulse 1118 which is 53 msec long once every sixty seconds to which presentation unit 1104 is synchronized. Presentation unit 1104 does not then look at the channel until sixty seconds later for synchronization pulse 1120. Because presentation unit 1110 is synchronized to receiver 1108, and receiver 1108 and receiver 1102 were randomly synchronized as previously described, only the presentation unit synchronized with receiver 1102 would receive the message over the second communications channel. In a large population of receivers and presentation units, chances are approximately 1 in 1000 that the wrong presentation unit will receive a message from another unit. If the oscillators in receiver 1102 and 1108 did not vary over time or temperature, receiver 1102 would always generate a synchronization pulse 1118 which is separated from receiver 1108 synchronization pulse 1122 by Tx seconds 1126. Since the oscillators are not high stability, over time the synchronization pulses 1128 and 1130 will eventually overlap for a period of time as shown in FIG. 11C. When this happens, presentation unit 1110 may receive a message transmitted to presentation unit 1104 by receiver 1102.

When the transmissions overlap as described, the receiver section of presentation unit 1110 can be captured by the signal generated by the transmitter in receiver 1102. When this occurs, transmissions generated by receiver 1108 to presentation unit 1110 could be interfered with, as both receiver 1102 and receiver 1108 are simultaneously transmitting on the same frequency, thus creating another problem.

Since users are capable of initiating synchronization of the presentation unit to the belt worn receiver, a user could also attempt to synchronize his presentation unit to the receiver of another user. When this happens, the security of the messages received by one user on the first communications channel would be compromised because of the common synchronization signal being employed on the second communications channel.

Reference now is directed to FIG. 12 which shows the secure synchronous signalling format 1200 which is utilized in the preferred embodiment of the present invention to prevent falsing of a presentation unit either intentionally, or unintentionally. In place of a common synchronization signal shown in FIG. 3, coded synchronization signals, or sync addresses 1202 and 1206 are provided. As shown in FIG. 12, where data blocks are continued, each data block 1204 is preceded by a sync address 1202. Each presentation unit is programmed to a unique sync address. In the preferred embodiment of the present invention, the sync address 1202 programmed corresponds to the word 2 of the GSC address to which the belt worn receiver is programmed. Since there are 4096 word 2's which are randomly assigned in a typical paging system, each presentation unit can be individually programmed with a correspondingly assigned coded sync signal, or sync address. As previously described, the assigned sync address is used to identify transmissions including data, and the inverse sync address identifies a synchronization signal. The sync address insures messages are not received by presentation units in close proximity to another user who has just received a message.

While the sync address provides message security for transmission on the second communications channel, it does not overcome the problem of two receivers transmitting in essentially the same time frame, as previously described in FIG. 11C. When the transmissions overlap, one or both presentation units may miss transmissions due to the receiver being captured by the transmitter of the other unit. If this occurs for more than two frames, which is very likely, the presentation units would lose synchronization and shut down, as previously described. When this happens, it will be appreciated that the transmissions could overlap for a period of time of ten minutes or longer, depending upon the relative stabilities of the oscillators of the two units. This problem can be overcome by randomly assigning different transmission time intervals to different units, such as sixty seconds and sixty seconds plus and minus one second, resulting in transmissions between different unit processing in time. By staggering the transmission intervals as described, when two units transmissions overlap, it would be only for, at most, a single transmission, rather than for the extended period of time possible where only a single fixed length transmission time interval is involved. The assignment of transmission time intervals can be linked to the coded synchronization word or can be completely random. It will be appreciated any system of assigning transmission times cannot guarantee that two units can still experience the interference problem by both being assigned the same transmission time.

Reference is directed back to FIG. 5. RAM B 506 is a specific section of RAM set aside to store the sync address corresponding to the word 2 of the belt worn unit. ROM B 510 is a specific section of ROM set aside to store a common synchronization word which is required to allow the wrist worn presentation unit to be programmed. The programming procedure will be discussed in detail shortly.

Figures 13A, 13B, 13C:
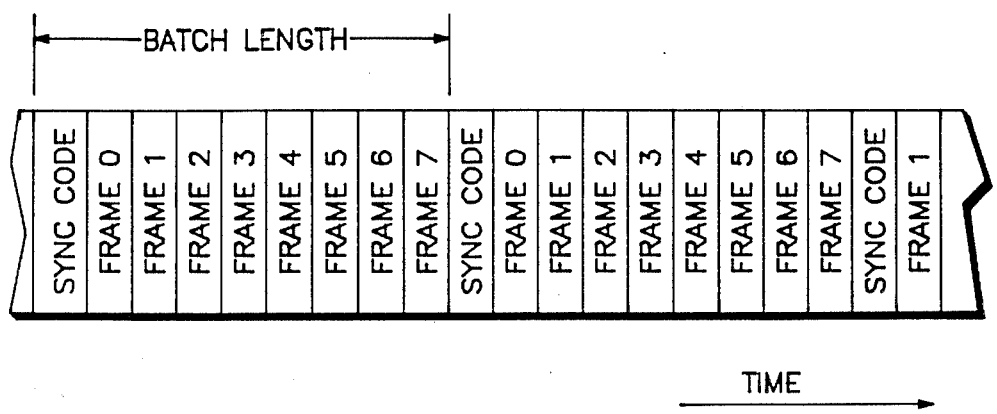
FIGS. 13A-C are diagrams describing the POCSAG signalling format.

It will be appreciated by those skilled in the art, that the concept of the coded synchronization word described for providing the battery saving function on the second communications channel can also be applied to the first communications channel. Synchronous systems, such as POCSAG, have periods of time, especially in the evening and night hours, when very few messages are received for transmission. In the POCSAG signalling format, as shown in FIG. 13, power is supplied to the receiver such that sync code is received, thereby maintaining system synchronization, and for an additional time interval corresponding to one of the following eight frames comprising the batch such as frame 2. In this manner, the battery saving function is provided. FIG. 13B shows the format of a typical POCSAG address, while FIG. 13C shows the format of a typical POCSAG data block. Each frame can consist of two addresses or an address followed by a data block. Messages longer than one data block are transmitted continuing into the following frames.

Within the POCSAG signalling format power is supplied to all receivers during the sync code and the assigned frame. There is no provision for inhibiting the power supplied to the receiver for particular frames. By inhibiting power being supplied to the receiver during the assigned frame when no addresses are to be transmitted, additional battery saving is obtained. In the preferred embodiment of the present invention, where a synchronous signalling format, such as POCSAG, is used for the first communications channel, a non-inverted sync code is used to indicate addresses and data message will be transmitted in the following frames. An inverted sync code indicates no address or data messages are in queue for transmission. As such power need not be supplied during the assigned frame, until the next expected sync code in the next batch. It will also be appreciated by one skilled in the art that the definition of inverted and noninverted sync word described above is a matter of choice.

When a sync address is provided for communication between the pager and presentation unit, it is most convenient to provide both synchronization of the two units and reprogramming of the sync address in the same operation, thereby eliminating any confusion on the part of the user, as to whether the sync loss is due to corruption of the synchronization signal causing loss of sync, or loss of sync address in the presentation unit.

When the presentation unit is to be programmed, both the pager and the presentation unit assigned a common sync address that is stored in the ROMs of each units. This common sync address allows the two units to communicate for the programming operation. The unique address to which the pager is programmed, is transmitted to the presentation unit as if it were a data message following the common sync address. Unlike a standard data message which is stored in RAM A and then displayed, the unique address is stored in RAM B of the presentation unit. This becomes the permanent sync address used in communication between the two units. In this manner, resynchronization and reprogramming is easily accomplished. New presentation units are easily programmed to communicate with an existing pager, or new pagers are easily programmed to communicate with existing presentation units. This is especially important where a problem in one of the units is encountered requiring service, a replacement for either unit will work with the remaining unit. When the presentation unit is considered a jewelry item, as may be the case with a female user, a single pager can communicate to wrist worn presentation units, broach or pendant type presentation units, or any other form factor, and be change and resynchronized as often as desired.

Figure 14:
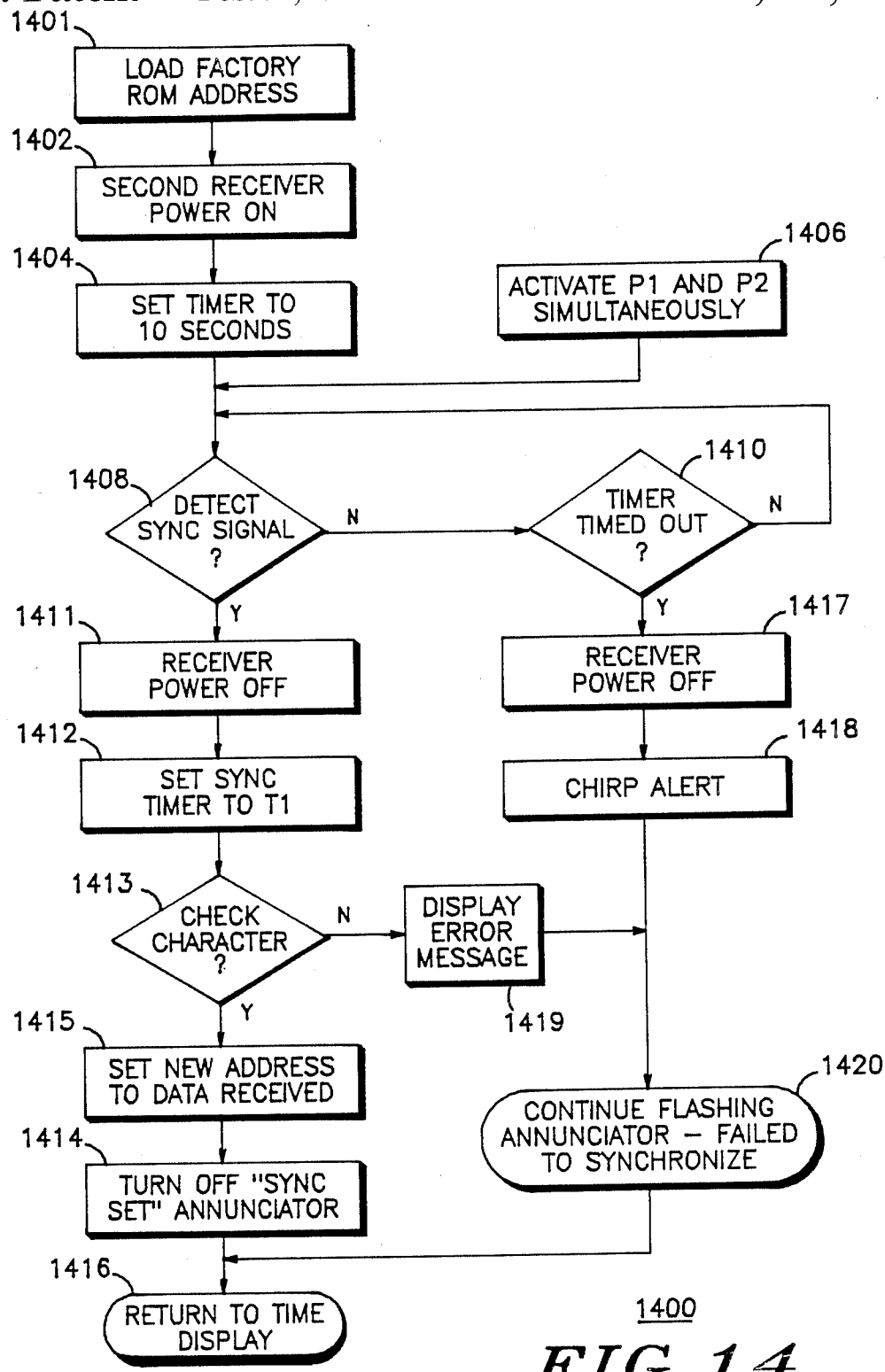
FIG. 14 is a flow chart describing the modified channel acquisition mode used in the preferred embodiment of the present invention.

Reference is now directed to FIG. 14 which shows flow chart 1400 indicating the modification to the sync acquisition mode, previously described in FIG. 9, which provides programming of the sync address. When the user has entered the sync acquisition mode as previously described in FIG. 8, power switch 236 supplies power to receiver 222 (as shown in FIG. 5) continuously, as shown at block 1402. Timer/counter 516 is set to a time interval, such as ten seconds, as shown at block 1404, which is long enough for the user to actuate and hold RESET (P1) switch 454 and actuate TRANSMIT (P2) switch 452, as shown at block 1406. A synchronization signal is then transmitted over the second communications channel, which when detected, as shown at block 1408, suspends power to the receiver, as shown at block 1411, and resets timer/counter 432 to the sync interval time T1 of sixty seconds, establishing the sync timer, as shown at block 1412. The bar CHANNEL indicator 616 is turned off and the triangular CHANNEL indicator stops flashing, as shown at block 1414, and the unit returns to the time display, as shown at block 1416, completing the resynchronization of the two units.

If the synchronization signal is not detected, as shown at block 1408, within the ten seconds time interval, as shown at block 1410, power to the receiver is suspended, as shown at block 1417, and an audible chirp is generated, as shown at block 1418, indicating the two units failed to synchronize. Triangular CHANNEL indicator 614 will continue to flash as shown at block 1420, and the unit will return to the time display, as shown at block 1416. The user must reenter the channel acquisition mode, as previously described, to again attempt to reprogram the presentation unit and resynchronize the two units.

An apparatus comprising a belt or pocket worn unit and a wrist worn presentation unit has been described. The belt or pocket worn unit operates on a first, or conventional, communications channel and provides excellent receiver sensitivity, reliable message reception, and good battery lie. Messages received by the belt or pocket worn unit are stored within the unit and then retransmitted on a second communications channel to a wrist worn presentation unit. When received, the message is stored within the wrist worn unit where it is conveniently displayed. Annunciators in the belt or pocket worn unit and/or the wrist worn presentation unit alert the user of a received message. Switches are provided on the units which allow resetting of the alerts on either or both of the units, retransmission of previously received messages from the belt or pocket worn unit to the wrist worn presentation unit, and review of messages currently stored in the wrist worn presentation unit.

A coded synchronization system is provided for communications between the belt worn unit and the wrist worn presentation unit. The coded synchronization system provides improved battery life and secure communications. When implemented on the main communications channel, the coded synchronization system can provide improved battery life for the belt worn unit which is a function of the system loading.

We claim:

1. A method for providing an improved battery saving function for a battery powered personal communications receiver, the receiver normally being powered during a first periodically transmitted predetermined time interval for receiving synchronization signals, and during at least one of a plurality of additional predetermined time intervals to which the receiver is assigned following the synchronization signal, for receiving coded message signals, said method comprising the steps of:

generating and transmitting a first coded synchronization signal when coded message signals are to be transmitted in at least one of the plurality of additional time intervals;

generating and transmitting a second coded synchronization signal in place of the first synchronization signal when coded message signals are not to be transmitted in any of the plurality of additional time intervals;

maintaining receiver synchronization with the system when either the first or the second coded synchronization signals are received; and suspending the supply of power to the receiver immediately following the receipt the second synchronization signal, whereby the supply of power to the receiver is suspended during the additional time interval coded message signals are not to be transmitted.

2. The method according to claim 1 wherein the first and second synchronization signals are coded binary information.

3. The method according to claim 2 wherein the second synchronization signal is the complement of the first synchronization signal.

4. A system providing an improved battery saving function for a personal communications receiver, the receiver normally being powered during a first periodically transmitted predetermined time interval for receiving synchronization signals, and during at least one of a plurality of additional predetermined time intervals to which the receiver is assigned following the synchronization signal, for receiving coded message signals, said system comprising:

sync generating means, periodically generating the synchronization signals, the synchronization signals being coded, said sync generating means generating a first coded synchronization signal when coded message signals are to be transmitted in at least one of the plurality of additional time intervals said sync generating means further generating a second coded synchronization signal in place of said first synchronization signal when coded message signals are not to be transmitted in any of the plurality of additional time intervals;

transmitter means, coupled to said sync generating means, for transmitting the coded synchronization and coded message signals;

battery powered receiver means for receiving and detecting the transmitted coded synchronization and coded message signals; and controller means, responsive to said received coded synchronization signals for maintaining receiver synchronization, said controller means supplying power to said receiver means for the additional time interval for receiving coded message signals when the first synchronization signal is received, and suspending the supply of power to said receiver means for the additional time interval when the second synchronization signal is received.

5. The system for transmitting messages according to claim 4 wherein the first and second synchronization signals are coded binary information.

6. The system for transmitting messages according to claim 5 wherein the second synchronization signal is the complement of the first synchronization signal.

7. A personal communications receiving system comprising:
a first receiver having,
a first receiver portion for receiving and detecting coded message signals including selective call signalling and message information being transmitted on a first communication channel,
an address memory for storing predetermined address information.
a controller, coupled to said receiver portion and to said address memory, said controller generating a control signal in response to the selective call signalling matching the predetermined address information.
said controller further having sync generating means, for periodically generating first and second coded synchronization signals, said sync generating means being responsive to the control signal for generating the first coded synchronization signal, at least once, in place of the second coded synchronization signal when coded message signals are received, and
transmitter means, coupled to said controller, for transmitting the coded synchronization signals on a second communications channel, said transmitter means further transmitting the received coded message signals during an additional time interval following the transmission of the first coded synchronization signal; and
a second receiver means separate from the first receiver having,
a second receiver portion, for receiving and detecting the coded synchronization and coded message signals transmitted on the second communications channel, and
second controller means, coupled to said second receiver portion, and responsive to the detected coded synchronization signals, for supplying power to said second receiver portion in synchronism with the transmitted coded synchronization signals, said second controller means further supplying power to said second receiver portion for an additional time interval to receive the coded message signals when the first coded synchronization signal is received, and further suspending the supply of power to said second receiver means when the second coded synchronization signal is received.

8. The system of claim 7 further comprising second memory means for storing address information corresponding to the predetermined address information stored in said address memory, said address information defining the coded synchronization signals.

9. The system according to claim 7 wherein said second coded synchronization signal is the complement of the first coded synchronization signal.

10. A transmitter for providing an improved battery saving function for a personal communications receiver, the receiver normally being powered during a first periodically transmitted predetermined time interval for receiving synchronization signals, and during at least one of a plurality of additional predetermined time intervals to which the receiver is assigned following the synchronization signal, for receiving coded message signals, said transmitter comprising:

sync generating means, periodically generating the synchronization signals, the synchronization signals being coded, said sync generating means generating a first coded synchronization signal when coded message signals are to be transmitted in at least one of the plurality of additional time intervals, said sync generating means further generating a second coded synchronization signal in place of said first synchronization signal when coded message signals are not to be transmitted in any of the plurality of additional time intervals; and transmitter means, coupled to said sync generating means, for transmitting the coded synchronization and coded message signals.

11. The transmitter of claim 10 wherein the first and second coded synchronization signals are coded binary information.

12. The transmitter of claim 11 wherein the first coded synchronization signal is the complement of the second coded synchronization signal.

13. A personal communications receiver having an improved battery saving function, the receiver normally being powered during a first periodically transmitted predetermined time interval for receiving synchronization signals, and during at least one of a plurality of additional predetermined time intervals to which the receiver is assigned following the synchronization signal, for receiving coded message signals, the receiver comprising:
- battery powered receiver means for receiving and detecting the transmitted coded synchronization and coded message signals; and
- controller means, responsive to said received coded synchronization signals for maintaining receiver synchronization, said controller means supplying power to said receiver means for the additional time interval for receiving coded message signals when the first synchronization signal is received, and suspending the supply of power to said receiver means for the additional time interval when the second synchronization signal is received.

14. The receiver of claim 13 wherein the first and second coded synchronization signals are coded binary information.

15. The receiver of claim 14 wherein the first coded synchronization signal is the complement of the second coded synchronization signal.

* * * * *